US005414052A

United States Patent [19]

Mahabadi et al.

[11] Patent Number: 5,414,052

[45] Date of Patent: May 9, 1995

[54] PROCESSES FOR PREPARING TONER

[75] Inventors: Hadi K. Mahabadi; Enno E. Agur, both of Toronto, Canada; Hui Chang, Pittsford, N.Y.; Gerald R. Allison, Oakville; Michael S. Hawkins, Cambridge, both of Canada; Joo T. Chung, Penfield, N.Y.

[73] Assignee: Xerox Corporation, Stamford, Conn.

[21] Appl. No.: 64,773

[22] Filed: May 21, 1993

[51] Int. Cl.[6] .............................................. C08G 63/02

[52] U.S. Cl. .................................... 525/437; 264/211; 264/211.24; 430/31; 523/500; 523/512; 524/854; 526/78; 526/86; 526/227; 526/321; 528/272

[58] Field of Search ................... 526/78, 86, 227, 321; 524/854; 523/500, 512; 430/31; 525/437; 264/211, 211.24

[56] References Cited

U.S. PATENT DOCUMENTS

| | | | |
|---|---|---|---|
| 3,681,106 | 8/1972 | Burns et al. | 117/17.5 |
| 3,941,898 | 3/1976 | Sadamatsu et al. | 427/18 |
| 4,604,338 | 8/1986 | Gruber et al. | 430/106 |
| 4,824,750 | 4/1989 | Mahalek et al. | 430/99 |
| 5,057,392 | 10/1991 | McCabe et al. | 430/109 |
| 5,158,725 | 10/1992 | Handa et al. | 264/40.7 |
| 5,227,460 | 7/1993 | Mahabadi et al. | 528/272 |

*Primary Examiner*—John Kight, III
*Assistant Examiner*—R. F. Johnson
*Attorney, Agent, or Firm*—E. O. Palazzo

[57] ABSTRACT

A one step process for the preparation of toner compositions which comprises adding to an extruder a base resin, initiator, pigment, and optional charge enhancing additive; effecting crosslinking of the base resin in the extruder to provide a toner comprising a pigment, optional charge additive and crosslinked resin comprising linear portions and crosslinked portions; and wherein said crosslinked portions are comprised of densely crosslinked microgel particles.

32 Claims, 1 Drawing Sheet

PROCESSES FOR PREPARING TONER

BACKGROUND OF THE INVENTION

The present invention is generally directed to processes for the preparation of toners, and more specifically to economical one step direct processes for modifying toner resin characteristics, and the preparation of toner compositions thereafter. More specifically, The present invention relates to melt mixing processes, batch or continuous, and preferably continuous processes such as, for example, extrusion for the preparation of toner compositions, and wherein the toner resin is comprised of certain crosslinked fraction generated during toner preparation, reference copending patent application U.S. Ser. No. 814,641 (D/91117) and U.S. Pat. No. 5,227,460 (D/91117Q), the disclosures of which are totally incorporated herein by reference, and which applications illustrate, for example, melt mixing processes for preparing toner including the first step of a reactive melt mixing process to crosslink a base resin and the second step of a melt mix process to prepare a toner from the crosslinked resin by incorporating toner additives. With the processes of these copending patent applications, two melt mixing steps are selected to prepare a toner from a base resin. The present invention combines the reactive melt mixing and the toner additive mixing in a one step process. Thus, with the processes of the present application, only one melt mixing step or one operation through a melt mixing device is needed for preparing toner directly from a base resin, and which process offers economical advantages. The toner prepared in accordance with the processes of the present invention can be selected for heat fixable imaging and printing, such as xerographic methods, and wherein there results excellent fusing and vinyl offset performance.

Toner utilized in development in the electrographic process is generally prepared by mixing and dispersing a colorant and a charge enhancing additive into a thermoplastic binder resin, followed by micropulverization. As the thermoplastic binder resin, several polymers are known including polystyrenes, styrene-acrylic resins, styrene-methacrylic resins, styrene-butadiene resins, polyesters, epoxy resins, acrylics, urethanes and copolymers thereof. As the colorant, carbon black is utilized often, and as the charge enhancing additive, alkyl pyridinium halides, distearyl dimethyl ammonium methyl sulfate, and the like are known.

Toner can be fixed to a support medium such as a sheet of paper or transparency by different fixing methods. A fixing system which is very advantageous in heat transfer efficiency and is especially suited for high speed electrophotographic processes is hot roll fixing. In this method, the support medium carrying a toner image is transported between a heated fuser roll and a pressure roll with the image face contacting the fuser roll. Upon contact with the heated fuser roll, the toner melts and adheres to the support medium forming a fixed image.

Fixing performance of the toner can be characterized as a function of temperature. The lowest temperature at which the toner adheres to the support medium is referred to as the cold offset temperature (COT), and the maximum temperature at which the toner does not adhere to the fuser roll is known as the hot offset temperature (HOT). When the fuser temperature exceeds HOT, some of the molten toner adheres to the fuser roll during fixing and is transferred to subsequent substrates containing developed images, resulting for example in blurred images. This undesirable phenomenon is called offsetting. Between the COT and HOT of the toner is the minimum fix temperature (MFT) which is the minimum temperature at which acceptable adhesion of the toner to the support medium occurs, as determined by, for example, a creasing test. The difference between MFT and HOT is called the fusing latitude.

The hot roll fixing system described above and a number of toners presently used therein exhibit several problems. First, the binder resins in the toners can require a relatively high temperature in order to be affixed to the support medium. This may result in high power consumption, low fixing speeds, and reduced life of the fuser roll and fuser roll bearings. Second, offsetting can be a problem; third, toner containing vinyl type binder resins such as styrene-acrylic resins may have an additional problem which is known as vinyl offset. Vinyl offset occurs when a sheet of paper or transparency with a fixed toner image comes in contact for a period of time with a polyvinyl chloride (PVC) surface containing a plasticizer used in making the vinyl material flexible such as, for example, in vinyl binder covers, and the fixed image adheres to the PVC surface.

There is a need for a toner prepared by simple economical one step processes which has a low fix temperature and a high offset temperature (or wide fusing latitude), and superior vinyl offset property. Toners which operate at lower temperatures would reduce the power needed for operation and increase the life of the fuser roll and the high temperature fuser roll bearings. Additionally, such low melt toners, that is, for example, toners having an MFT lower than 200° C., and preferably lower than 160° C., would reduce the volatilization of release oil such as silicone oil which may occur during high temperature heating operation and which can cause problems when the volatilized oil condenses in other areas of the machine. In particular, toners with a wide fusing latitude and with acceptable toner particle elasticity are needed. Toners with wide fusing latitude can provide flexibility in the amount of oil needed as release agent and can minimize copy quality deterioration related to toner offsetting to the fuser roll.

To lower the minimum fix temperature of the binder resin, in some instances the molecular weight of the resin may be lowered. Low molecular weight resins, such as amorphous polyester resins and epoxy resins, have been used for low fixing temperature toners. For example, the use of polyester resins as a toner binder is disclosed in U.S. Pat. No. 3,590,000 to Palermiti et al. and U.S. Pat. No. 3,681,106 to Burns et al. The minimum fixing temperature of polyester binder resins can be lower than that of other materials, such as styrene-acrylic and styrene-methacrylic resins. However, this may lead to a lowering of the hot offset temperature, and as a result decreased offset resistance. In addition, the glass transition temperature of the resin may be decreased, which may cause the undesirable phenomenon of blocking of the toner during storage.

To prevent fuser roll offsetting and to increase fusing latitude of toners, various modifications of binder resin structure have been made, for example, by branching or crosslinking. In U.S. Pat. No. 3,681,106 to Burns et al., for example, a polyester resin was improved with respect to offset resistance by nonlinearly modifying the polymer backbone by mixing a trivalent or more polyol or polyacid with the monomer to generate branching during polycondensation. However, an increase in degree of branching may result in an elevation of the minimum fix temperature. Thus, any initial advantage of low temperature fix may be diminished.

Another method of improving offset resistance is to utilize crosslinked resin in the binder resin. For example, U.S. Pat. No. 3,941,898 to Sadamatsu et al. discloses a toner in which a crosslinked vinyl type polymer is used as the binder resin. Similar disclosures for vinyl type resins are made in U.S. Pat. Re. No. 31,072 (a reissue of U.S. Pat. No. 3,938,992) to Jadwin et al., U.S. Pat. No. 4,556,624 to Gruber et al., U.S. Pat. No. 4,604,338 to Gruber et al. and U.S. Pat. No. 4,824,750 to Mahalek et al.

While significant improvements can be obtained in offset resistance, a major drawback may ensue in that with crosslinked resins prepared by conventional polymerization, that is crosslinking during polymerization using a crosslinking agent, there exist three types of polymer configurations: a linear and soluble portion referred to as the linear portion, a portion comprising highly crosslinked gel particles which is not soluble in substantially solvents, like tetrahydrofuran, toluene and the like, and is called gel, and a crosslinked portion which is low in crosslinking density and therefore is soluble in some solvents, such as, tetrahydrofuran, toluene and the like, and is referred to as sol. The presence of highly crosslinked gel in the binder resin increases the hot offset temperature, but at the same time the low crosslink density portion or sol increases the minimum fix temperature. An increase in the amount of crosslinking in these types of resins results in an increase not only of the gel content, but also of the amount of sol or soluble crosslinked polymer with low degree of crosslinking in the mixture. This results in an elevation of the minimum fix temperature, and as a consequence, in a reduction or reduced increase of the fusing latitude. Also, a drawback of embodiments of crosslinked polymers prepared by conventional polymerization is that as the degree of crosslinking increases, the gel particles or very highly crosslinked insoluble polymer with high molecular weight grow larger. The large gel particles can be more difficult to disperse pigment in causing the formation of unpigmented toner particles during pulverization, and toner developability may thus be hindered. Also, compatibility with other binder resins may be relatively poor and toners containing vinyl polymers often show vinyl offset.

Crosslinked polyester binder resins prepared by conventional polycondensation reactions have been provided for improving offset resistance such as, for example, in U.S. Pat. No. 3,681,106 to Burns et al. As with crosslinked vinyl resins, increased crosslinking as obtained in such conventional polycondensation reactions may cause the minimum fix temperature to increase. When crosslinking is effected out during polycondensation using tri- or polyfunctional monomers as crosslinking agents with the polycondensation monomers, the net effect is that apart from obtaining highly crosslinked high molecular weight gel particles, which are not soluble in substantially any solvent, the molecular weight distribution of the soluble part widens due to the formation of sol or crosslinked polymer with a very low degree of crosslinking, which is soluble in some solvents. These intermediate molecular weight species may result in an increase in the melt viscosity of the resin at low and high temperature, which can cause the minimum fix temperature to increase. Furthermore, gel particles formed in the polycondensation reaction which is carried out using conventional polycondensation in a reactor with low shear mixing can grow rapidly with increase in degree of crosslinking. As in the case of crosslinked vinyl polymers using conventional polymerization reactions, these large gel particles may be more difficult to disperse pigment in, resulting in unpigmented toner particles after pulverization, and thus hindering developability.

Crosslinked polyester binder resins prepared by a reactive melt mixing process have been disclosed in U.S. Pat. N. 5,227,460 (D/91117Q), the disclosure of which is totally incorporated herein by reference. In this process, the crosslinking reaction is accomplished with a chemical initiator when the polymer is in the molten state. The crosslinked resin comprises crosslinked portions and linear portions. The crosslinked portions comprise very high molecular weight densely crosslinked gel particles having average diameter less than about 0.1 micron and are insoluble in substantially any solvent. The linear portion comprises low molecular weight resin soluble in various common solvents. Substantially no portion of the resin comprises sol or polymer with low degree of crosslinking. The crosslinked portions or microgel particles are prepared in such a manner that there is substantially no distance between the polymer chains. This crosslink structure is different from conventional crosslinking in which the crosslink distance between chains is quite large with several monomer units. The highly crosslinked microgel particles distributed throughout the linear portion impart elasticity to the resin, which improves the resin offset properties, while not substantially effecting the resin minimum fix temperature. This melt mixing process in U.S. Pat. No. 5,227,460 (D/91117Q) is a reactive melt mixing process whereby a base resin is converted into a resin with crosslinked fraction.

Many processes are known for effecting polymerization reactions, including reactive melt mixing processes, for both initial polymerization reactions employing monomers or prepolymers, and for polymer modification reactions, such as grafting, coupling, crosslinking and degradation reactions. The process is known as reactive extrusion process when the melt mixing device is an extruder. The reactive extrusion process is particularly advantageous for polymer modifications in many respects. The modification generally takes place when the polymer is in molten state, thus eliminating the use of a large amount of solvent whose handling is both difficult and costly. The extrusion process is inherently easier to control as compared to a large polymerization reactor vessel.

Melt mixing processes for preparing toner based on crosslinked polyester binder resin, such as those disclosed in U.S. Pat. No. 5,227,460 (D/91117Q), are illustrated in pending application U.S. Ser. No. 814,641 (D/91117), the disclosure of which is totally incorporated herein by reference. In these processes, polymers are crosslinked using chemical initiator as crosslinking agent in the molten state at high temperature in an extruder. The partially crosslinked resin prepared by the reactive extrusion process is subsequently melt blended again with a colorant, charge enhancing additives and the like to result in a toner mixture before pulverizing operation to obtain toner particles. Although the first reactive extrusion operation can prepare a toner resin comprising very high molecular weight densely crosslinked microgel particles which improve the resin offset properties, the need to subject the resin to a second extrusion operation wherein intensive mixing is employed to disperse toner additives will likely cause some of the gel particles to break down and thus narrow the fusing latitude. In addition, with the processes of these pending patent applications two melt mixing operations are required to first modify a base resin and then incorporate toner additives. These processes thus have the economical disadvantages typical of a two step process such as high operating cost and low production rate.

U.S. Pat. No. 5,057,392 to McCabe et al. discloses a low fusing temperature toner powder which employs a polyblend of a crystalline polyester and an amorphous polyester that has been crosslinked with an epoxy novolac resin in the presence of a crosslinking catalyst. The mixture, which includes the polyesters, the epoxy novolac resin, catalyst and colorant, is melt blended on heated compounding rolls or by passage through an extruder. During melt blending, the amorphous polymer is crosslinked with the epoxy novolac resin. Crosslinking substantially increases the offset latitude of the mixture. After melt blending, the mixture is annealed by being maintained at a temperature above the glass transition temperature of the amorphous polyester, but below the melting temperature of crystalline polyester, preferably in the range of 50° to 80° C. The annealing is continued for a time sufficient for the crystalline polyester to recrystallize as dispersed small particles within a matrix phase comprised of a crosslinked polymeric reaction product of the amorphous polyester and the epoxy novolac resin. Typical annealed times are in the range of about 0.2 to about 2 hours. If annealing is not carried out, the polyblend does not have the desired grindability and the toner powder derived therefrom does not have desired fusing temperature and keep characteristic. Though this patent claims a low fixing temperature toner, the toner composition is a specifically defined polymer blend including both amorphous and crystalline polyesters. Also, the melt blending and reaction process is not sufficient to provide a toner with desired properties. An additional annealing step, following melt blending, to recrystallize the crystalline polyester is necessary in order to provide the toner with optimum morphology. Another potential problem not addressed in the patent is the possibility of interference from some active toner additives during crosslinking. For instance, it is known that some carbon black pigments will inhibit certain types of polymer reactions.

Therefore, there remains a need for a toner composition and fabrication processes during which the toner properties can be optimized by a reaction, such as crosslinking in a simple straightforward manner.

SUMMARY OF THE INVENTION

It is an object of the present invention to provide simple and economical one step processes for the preparation of toners with many of the advantages illustrated herein. In this process, polymers are crosslinked in the molten state at high temperature producing substantially uniformly dispersed densely crosslinked microgels. Simultaneously or sequentially, other toner additives are dispersed within the polymer including the microgels. The processes can be carried out either by batch or by continuous melt blending devices, although a continuous device such as a twin screw extruder is preferred. With the present invention, there is provided a process whereby a base resin is modified and formulated into a toner in one step. The residence time that the resin is subjected to intensive mixing is, therefore, reduced, for example, in half and breakdown of crosslinked gel particles is lessened, as compared to a two step process. In addition, by combining the reactive melt mixing and the toner additive mixing operations, the invention of the present application has the economical advantages of low operating cost and high production rate by eliminating one melt mixing operation and the associated material losses during handling.

Another object of the present invention relates to extrusion processes for the preparation of low melting toner compositions in one step, and wherein the toner is comprised of certain crosslinked resins as illustrated herein, such as a thermoplastic resin which can be sufficiently fixed at low temperatures, such as below 200° C. and preferably below 160° C., by hot roll fixing. Thus, less heat or other source of energy is needed for fixing than for higher fix temperature toner, and therefore, less power is consumed during operation of a copier or printer. The undesirable paper curl phenomenon may also be reduced, or higher speed of copying and printing may be enabled. Also, the toners formulated possess excellent offset resistance, wide fusing latitude and acceptable rheological properties; are inexpensive, safe and economical; and show minimized or substantially no vinyl offset.

These and other objects of the present invention are accomplished in embodiments by a one step reactive melt blending process. In the process of the invention, a reactive resin, or base resin, such as, for example, an unsaturated linear polyester resin, is crosslinked in the molten state under high temperature and high shear conditions, preferably with a chemical initiator, such as, for example, organic peroxide, as a crosslinking agent in a melt blending device such as an extruder without forming any significant amounts of residual materials. Thus, the removal of byproducts or residual unreacted materials is not needed with embodiments of the process of the invention. No monomers need be utilized in the process of the invention, therefore, there is no need for removal of residual monomer. Other toner components such as colorants, charge enhancing additives and release agents are added to the blending device either simultaneously with the base resin and initiator or sequentially at a later point depending on whether a component will interfere with the crosslinking reaction. These toner components are dispersed within the crosslinked resin to obtain a toner composite with finely dispersed additives. The toner composite can then be formulated into toner following typical size reduction and classification steps. In preferred embodiments of this process, the base resin and initiator are preblended and fed to an extruder at an upstream location. Suitable extruder screw configuration and temperature may be used which enable the initiator to be dispersed throughout the polymer melt before the onset of crosslinking, and further, which provide a sufficient residence time for the crosslinking reaction to be carried out. Accurate temperature control along the length of the extruder enables the crosslinking reaction to be carried out in a controlled and reproducible fashion. Extruder screw configuration can also be designed, for example, by including more kneading elements to provide more mixing action to improve material distribution and promote reaction. Other toner additives may be added together with the base resin and the initiator, or fed separately to the extruder at a downstream location. Further, suitable screw configuration and temperature at downstream portion of the extruder may be used to facilitate the dispersion of various additives.

The process steps of the present invention in embodiments comprise (1) adding base resin, initiator and toner additives to a melt mixing device; (2) melting the base resin; (3) mixing the molten resin at low temperature to disperse the initiator; (4) initiating crosslinking of the molten polymer by increasing the temperature; (5) retaining the resulting polymer melt at high temperature so that partial crosslinking of the base resin can be achieved; (6) adding additional toner additives; (7) facilitating the dispersion of toner additives by providing mixing action at optimum levels of temperature and mixer speed; (8) optionally devolatilizing the melt to remove any effluent volatiles; and (9) discharging the molten mixture to a cooling device. The solidified toner mixture can then be pulverized and classified to obtain particles of desirable size and distribution.

The toner resin modified during reactive blending in the process of the present invention comprises crosslinked portions and linear portions. The crosslinked portions comprise very high molecular weight densely crosslinked gel particles having average diameter less than about 0.1 micron and insoluble in substantially any solvent, including tetrahydrofuran, toluene and the like. The linear portion comprises low molecular weight resin soluble in various solvents such as, for example, tetrahydrofuran, toluene and the like. The high molecular weight highly crosslinked gel particles are substantially uniformly distributed in the linear portions. Substantially no portion of the resin comprises sol or low crosslinked density polymer, such as that which would be obtained in conventional crosslinking processes such as polycondensation, bulk, solution, suspension, emulsion and dispersion polymerization processes.

DETAILED DESCRIPTION OF THE PREFERRED EMBODIMENTS

Figure 1:
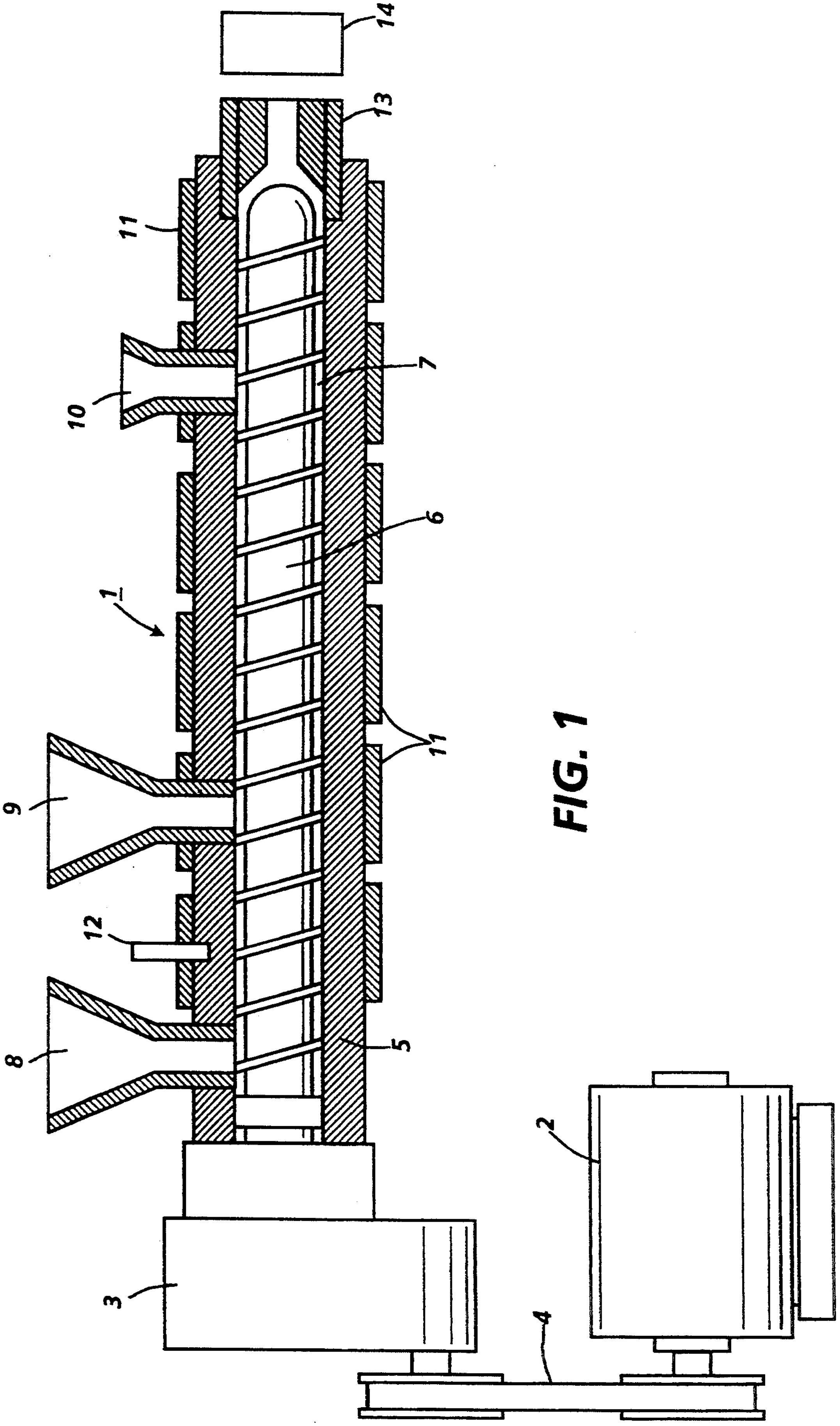
FIG. 1 is a partially schematic cross-sectional view of an extrusion process suitable for the process of the present invention.

The present invention provides an economical one step process for the preparation of a low fix temperature toner by carrying out both reactive melt mixing and toner additive dispersion in any melt mixing device, batch or continuous, but preferably continuous such as, for example, an extruder wherein base resin is crosslinked at high temperature and toner additives are uniformly dispersed within the resin under high shear condition. The crosslinking reaction can take place in the presence of toner additives or prior to the addition of these additives. Crosslinked resins prepared during the toner fabrication process of the present invention are disclosed in detail in copending application Ser. No. 814,641 (D/91117) and U.S. Pat. No. 5,227,460 (D/91117Q), the disclosures of which are hereby totally incorporated herein by reference.

Low fix temperature toners are fabricated by a reactive melt mixing/dispersion process comprising the steps of (1) adding base resin, initiator and toner additives to a melt mixing device; (2) melting the base resin, thereby forming a polymer melt, in the melt mixing device; (3) mixing the molten resin at low temperature to disperse the initiator; (4) initiating crosslinking of the molten polymer by increasing temperature; (5) retaining the polymer melt mixture at high temperature that partial crosslinking of the base resin may be achieved while simultaneously providing high shear to keep the gel particles formed during crosslinking small in size and well distributed in the melt; (6) adding additional toner additives; (7) facilitating the dispersion of toner additives by providing sufficient mixing action at optimum levels of temperature and mixer speed; (8) optionally devolatilizing the melt to remove any effluent volatiles; and (9) discharging the molten mixture to a cooling device.

In a preferred embodiment, the process comprises the steps of (1) feeding the base resin, initiator and toner additives to an extruder; (2) melting the base resin, thereby forming a polymer melt; (3) mixing the molten base resin, pigment, optional toner additives, such as charge enhancing additives, wax components, and the like; and initiator at from about the melting temperature or softening temperature of the base resin to about the onset temperature of crosslinking to enable a dispersion of all the components in the base resin before the onset of crosslinking; (4) initiating crosslinking of the base resin by raising the melt temperature to from about 10° C. to about 100° C. above the onset temperature of crosslinking; (5) retaining the polymer melt at elevated temperatures such that the required amount of crosslinking is achieved while at the same time providing high shear to retain the gel particles formed during crosslinking small in size and distributed throughout the polymer melt; (6) feeding additional toner additives to the extruder at a downstream location after the reaction zone; (7) keeping the mixing action and temperature downstream at optimum levels to enable fine dispersion of toner additives; (8) optionally devolatilizing the melt to remove any effluent volatiles; and (9) pumping the melt through a die to a pelletizer, thereby resulting in a toner with a partially crosslinked resin in a one step process.

In the process of the present invention, the fabrication of the low fix temperature toners may be carried out in a melt mixing device such as an extruder described in U.S. Pat. No. 4,894,308 to Mahabadi et al., the disclosure of which is totally incorporated herein by reference. Generally, any intensive melt mixing device suitable for processing polymer melts may be employed provided that the objectives of the present invention are achieved. Examples of continuous melt mixing devices include single screw extruders or twin screw extruders, continuous internal mixers, disc extruders and roll mill extruders. Examples of batch internal melt mixing devices include Banbury, Brabender and Haake mixers.

One suitable type of extruder is the fully intermeshing corotating twin screw extruder such as, for example, the ZSK series of twin screw extruders available from Werner & Pfleiderer Corporation, Ramsey, N.J. U.S.A. For example, a small ZSK-30 twin screw extruder has a screw diameter of 30.7 millimeters and a length-to-diameter (L/D) ratio of 37.2. The extruder can melt the base resin, mix the initiator into the base resin melt, provide high temperature and adequate residence time for the crosslinking reaction to be carried out, disperse toner additives into the partially crosslinked resin, optionally devolatilize the melt to remove any effluent volatiles if needed, and pump the melt through a die such as, for example, a strand die to a pelletizer. Reactive extrusion process whereby chemical reaction occurs in molten polymer is particularly efficient, and is advantageous because it does not involve large amount of solvent and thus is easily environmentally controlled.

It is also advantageous because it permits a high degree of initial mixing of base resin and initiator to take place, and provides an environment wherein a controlled high temperature (adjustable along the length of the extruder) is available so that a reaction can occur in less than 10 minutes and preferably less than 5 minutes. It also enables a reaction to take place continuously, and thus the reaction is not limited by the disadvantages of a batch process, wherein the reaction must be repeatedly stopped so that the reaction products may be removed and the apparatus cleaned and prepared for another similar reaction. As soon as the desired amount of crosslinking is achieved, the reaction products are moved away from the reaction zone.

For a better understanding of the present invention, a typical extrusion apparatus suitable for the process of the present invention is illustrated in FIG. 1. In this Figure, there is shown a twin screw extrusion device 1 containing a drive motor 2, a gear reducer 3, a drive belt 4, an extruder barrel 5, a screw 6, a screw channel 7, an upstream supply port or hopper 8, a downstream supply port 9, a downstream devolatilizer 10, a heater 11, a thermocouple 12, a die or head pressure generator 13, and a pelletizer 14. The barrel 5 consists of modular barrel sections, each separately heated with heater 11 and temperature controlled through thermocouple 12 and temperature controller not shown in the figure. With modular barrel sections, it is possible to locate feed ports and devolatilizing ports at required locations, and to provide individual temperature control along the screw channel 7. The screw 6 is also modular in construction in the form of pieces of elements, enabling the screw to be configured with different conveying elements and kneading elements having the appropriate lengths, pitch angles, etc. in such a way as to provide optimum conveying, mixing, reaction, dispersing, devolatilizing and pumping conditions.

In one preferred embodiment of the process of the present invention the materials to be reacted or dispersed, that is the base resin, chemical initiator and toner additives, enter the extrusion apparatus from the first upstream supply port 8 and/or the second downstream supply port 9. The base resin, usually in the form of solid powders, pellets, granules, or other forms, can be fed to the first upstream supply port 8 and second downstream supply port 9 by gravity feeding, volumetric feeding, weigh feeding, or other known feeding methods. Feeding of the chemical initiator to the extruder depends in part on the nature of the initiator. In one embodiment of the invention, especially if the initiator is in solid form, the base resin and initiator and/or toner additives are premixed prior to being added to the extruder, and the preblend may be added through the upstream supply port 8. In another embodiment, especially if the initiator is a liquid, the initiator can preferably be added to the extruder separately through the upstream supply port 8 or another location close to 8 using a liquid metering device. The above examples do not preclude other methods of adding the base resin, initiator, and additives to the extruder. After the base resin, initiator, and additives have been fed into screw channel 7, the resin is melted and the initiator and additives are dispersed into the molten resin as it is heated, but preferably still at a lower temperature than is needed for crosslinking. Heating takes place from two sources: (1) external barrel heating from heater 11, and (2) internal heating from viscous dissipation within the polymer melt itself. When the temperature of the molten resin and initiator reach a sufficiently high level, a rapid crosslinking reaction takes place. It is preferable that the time required for completion of the crosslinking reaction not exceed the residence time in the channel 7. The rotational speed of the extruder screw preferably ranges from about 50 to about 500 revolutions per minute. The toner additives added at the upstream supply port 8 are gradually dispersed into the resin. Additional toner additives may be added downstream at the supply port 9, if necessary, and when the presence of certain toner additives may interfere with and, therefore, hinder the crosslinking reaction of the base resin. In this situation, it is preferable to add the toner additives at the downstream supply port after the crosslinking reaction has taken place in the upstream portion of the extruder. Certain carbon blacks are known to behave as inhibitor for free radicals, thus depriving polymer reaction of the free radicals necessary for the reaction to propagate. It may, therefore, be preferable to feed these carbon blacks at the downstream supply port. The dispersion of additives can further be promoted by using more kneading screw elements at downstream portion of the screws. Optimum temperature control can also facilitate the dispersion of additives. As the melt temperature is lowered, the melt viscosity will increase giving a higher shear stress. If needed, volatiles may be removed through downstream devolatilizer 10 by applying a vacuum. At the end of screw channel 7, the crosslinked resin with additives is pumped in molten form through die 13 such as, for example, a strand die to pelletizer 14 such as, for example, a water bath pelletizer, an underwater granulator, etc.

With further reference to FIG. 1, the rotational speed of the screw 6 can be of any suitable value provided that the objectives of the present invention are achieved. Generally, the rotational speed of screw 6 is from about 50 revolutions per minute to about 500 revolutions per minute. The barrel temperature, which is controlled through thermocouple 12 and generated in part by heaters 11, is from about 40° C. to about 250° C. The temperature range for mixing the base resin and initiator in the upstream barrel sections immediately following the supply port 8 is from about the melting temperature of the base resin to below the crosslinking temperature, and preferably within about 40° C. of the melting temperature of the base resin. For example, for an unsaturated polyester base resin the temperature is preferably about 90° C. to about 130° C. The temperature range for the crosslinking reaction in the barrel zones after mixing the resin and the initiator is above the base resin melting temperature and also depends on the initiator used, preferably within about 150° C. of the base resin melting temperature. For example, for an unsaturated polyester base resin, the temperature is preferably about 90° C. to about 250° C. The temperature of barrel sections following reaction zone can be lowered to facilitate the dispersion of toner additives. The die or head pressure generator 13 generates pressure from about 50 pounds per square inch to about 500 pounds per square inch. In one embodiment, the screw is allowed to rotate at about 100 revolutions per minute, the temperature along barrel 5 is maintained at about 70° C. in the first barrel section, 160° C. in the reaction zone, and 120° C. further downstream, and the die pressure is about 50 pounds per square inch.

Thus, in a process embodiment of the present invention, a reactive base resin, a chemical initiator, and toner additives are fed to a melt mixing apparatus and crosslinking is carried out at high temperature and high shear to generate a partially crosslinked resin which is mixed with toner additives to prepare a low fix temperature toner with excellent offset performance and vinyl offset properties. The base resin used in the process of this invention is a reactive polymer, preferably a linear reactive polymer such as, for example, linear unsaturated polyester. In preferred embodiments, the base resin has a degree of unsaturation of about 0.1 to about 30 mole percent, preferably about 5 to about 25 mole percent.

In preferred embodiments, the linear unsaturated polyester base resin is characterized by the number average molecular weight ($M_n$) as measured by gel permeation chromatography (GPC) in the range typically from about 1,000 to about 20,000, and preferably from about 2,000 to about 5,000, and weight average molecular weight ($M_w$) in the range typically from about 2,000 to about 40,000, and preferably from about 4,000 to about 15,000. The molecular weight distribution ($M_w/M_n$) is in the range typically from about 1.5 to about 6, and preferably from about 2 to about 4. The onset glass transition temperature ($T_g$) as measured by differential scanning calorimetry (DSC) is in the range typically from about 50° C. to about 70° C., and preferably from about 51° C. to about 65° C. Melt viscosity as measured with a mechanical spectrometer at 10 radians per second is from about 5,000 to about 200,000 poise, and preferably from about 20,000 to about 100,000 poise at 100° C. and drops sharply with increasing temperature to from about 100 to about 5,000 poise, and preferably from about 400 to about 2,000 poise as temperature rises from 100° C. to 130° C.

Examples of linear unsaturated polyesters situated as the base resin are low molecular weight condensation polymers which may be formed by the step-wise reactions between both saturated and unsaturated diacids (or anhydrides) and dihydric alcohols (glycols or diols). The resulting unsaturated polyesters are reactive, crosslinkable, at (i) unsaturation sites (double bonds) along the polyester chain, and (ii) functional groups such as carboxyl, hydroxy, etc. groups amenable to acid-base reactions. Typical unsaturated polyester base resins useful for this invention are prepared by melt polycondensation or other polymerization processes using diacids and/or anhydrides and diols. Suitable diacids and dianhydrides include but are not limited to saturated diacids and/or anhydrides such as, for example, succinic acid, glutaric acid, adipic acid, pimelic acid, suberic acid, azelaic acid, sebacic acid, isophthalic acid, terephthalic acid, hexachloroendo methylene tetrahydrophthalic acid, phthalic anhydride, chlorendic anhydride, tetrahydrophthalic anhydride, hexahydrophthalic anhydride, endomethylene tetrahydrophthalic anhydride, tetrachlorophthalic anhydride, tetrabromophthalic anhydride, and the like, and mixtures thereof; and unsaturated diacids and/or anhydrides such as, for example, maleic acid, fumaric acid, chloromaleic acid, methacrylic acid, acrylic acid, itaconic acid, citraconic acid, mesaconic acid, maleic anhydride, and the like, and mixtures thereof. Suitable diols include, but are not limited to, for example, propylene glycol, ethylene glycol, diethylene glycol, neopentyl glycol, dipropylene glycol, dibromoneopentyl glycol, propoxylated bisphenol-A, 2,2,4-trimethylpentane-1,3-diol, tetrabromo bisphenol dipropoxy ether, 1,4-butanediol, and the like, and mixtures thereof, soluble in good solvents such as, for example, tetrahydrofuran, toluene and the like.

Preferred unsaturated polyester base resins are prepared from diacids and/or anhydrides such as, for example, maleic anhydride, fumaric acid, and the like, and mixtures thereof; and diols such as, for example, propoxylated bisphenol A, propylene glycol, and the like and mixtures thereof. A particularly preferred polyester is poly(propoxylated bisphenol A fumarate).

Substantially any suitable unsaturated polyester can be used to make the toner resins of the invention; including unsaturated polyesters known for use in toner resins and including unsaturated polyesters whose properties previously made them undesirable or unsuitable for use as toner resins (but which adverse properties are eliminated or reduced by preparing them in the partially crosslinked form of the present invention).

Chemical initiators such as, for example, organic peroxides or azo-compounds are preferred for making the crosslinked toner resins of the invention. Suitable organic peroxides include diacyl peroxides such as, for example, decanoyl peroxide, lauroyl peroxide and benzoyl peroxide, ketone peroxides such as, for example, cyclohexanone peroxide and methyl ethyl ketone, alkyl peroxyesters such as, for example, t-butyl peroxy neodecanoate, 2,5-dimethyl(2-ethyl hexanoyl peroxy) hexane, t-amyl peroxy 2-ethyl hexanoate, t-butyl peroxy 2-ethyl hexanoate, t-butyl peroxy acetate, t-amyl peroxy acetate, t-butyl peroxy benzoate, t-amyl peroxy benzoate, o-t-butyl o-isopropyl mono peroxy carbonate, 2,5-dimethyl(benzoyl peroxy) hexane, o-t-butyl o-(2-ethyl hexyl) mono peroxy carbonate, and o-t-amyl o-(2-ethyl hexyl) mono peroxy carbonate, alkyl peroxides such as, for example, dicumyl peroxide, 2,5-dimethyl(t-butyl peroxy) hexane, t-butyl cumyl peroxide, α-α-bis(t-butyl peroxy) diisopropyl benzene, di-t-butyl peroxide and 2,5-dimethyl 2,5-di(t-butyl peroxy) hexane-3, alkyl hydroperoxides such as, for example, 2,5-dihydro peroxy 2,5-dimethyl hexane, cumene hydroperoxide, t-butyl hydroperoxide and t-amyl hydroperoxide, and alkyl peroxyketals such as, for example, n-butyl 4,4-di(t-butyl peroxy) valerate, 1,1-di(t-butyl peroxy) 3,3,5-trimethyl cyclohexane, 1,1-di(t-butyl peroxy) cyclohexane, 1,1-di(t-amyl peroxy) cyclohexane, 2,2-di(t-butyl peroxy) butane, ethyl 3,3-di(t-butyl peroxy) butyrate and ethyl 3,3-di(t-amyl peroxy) butyrate. Suitable azo-compounds include azobis-isobutyronitrile, 2,2'-azobis(isobutyronitrile), 2,2'-azobis(2,4-dimethyl valeronitrile), 2,2'-azobis(methyl butyronitrile), 1,1'-azobis(cyano cyclohexane) and other similar known compounds.

An effective concentration of initiator is adequate to accomplish the crosslinking, for example in the range of from about 0.01 to about 10 percent by weight of initiator in the base resin, and preferably in the range of from about 0.1 to about 4 percent by weight of initiator in the base resin. By permitting use of low concentrations of chemical initiator and utilizing all of it in the crosslinking reaction, the residual contaminants produced in the crosslinking reaction in preferred embodiments can be minimal. Since the crosslinking can be carried out at high temperature, the reaction is very rapid, for example less than about 10 minutes, preferably about 2 seconds to about 5 minutes residence time, and thus little or no unreacted initiator remains in the product.

The crosslinking which occurs in the process of the present invention is characterized by at least one reactive site, that is one unsaturation, within a polymer chain reacting substantially directly with, for example, no intervening monomers, with at least one reactive site within a second polymer chain, and by this reaction occurring repeatedly to form a series of crosslinked units. This manner of crosslinking between chains will produce a large, high molecular weight molecule ultimately forming a gel. The polymer crosslinking reaction may occur by a number of mechanisms. For example, when an exemplary propoxylated bisphenol A fumarate unsaturated polymer undergoes a crosslinking reaction with a chemical crosslinking initiator, such as, for example, benzoyl peroxide, free radicals produced by the chemical initiator may attack an unsaturation site, that is double bonds on the polymer, to form polymer radicals. Crosslinking occurs as these polymeric radicals react with other unsaturated chains or other polymeric radicals many times forming very high molecular weight gel particles with high crosslinking density. By a second mechanism, crosslinking may occur between chains of the same exemplary molecule where the free radicals formed from a chemical crosslinking initiator attack the carbon of the propoxy group by hydrogen abstraction of a tertiary hydrogen to form polymer radicals.

In the partially crosslinked resin of the present toner, the crosslinked portion comprises microgel particles, preferably up to about 0.1 micron in average volume particle diameter as determined by scanning electron microscopy and transmission electron microscopy. When produced by a reactive melt mixing process wherein the crosslinking occurs at high temperature and under high shear, the size of the microgel particles does not continue to grow with increasing degree of crosslinking. Also, the microgel particles are distributed substantially uniformly throughout the linear portion.

The crosslinked portions or microgel particles in toner of the present invention are prepared in the extruder in such a way that there is substantially no distance between the polymer chains. Thus, the crosslinking is preferably not accomplished via monomer or polymer bridges. The polymer chains are directly connected, for example, at unsaturation sites or other reactive sites, or in some cases by a single intervening atom such as, for example, oxygen. Therefore, the crosslinked portions are very dense and do not swell as much as gel produced by conventional crosslinking methods. This crosslink structure is different from conventional crosslinking in which the crosslink distance between chains is quite large with several monomer units, and where the gels swell very well in a solvent such as tetrahydrofuran or toluene. These highly crosslinked dense microgel particles distributed throughout the linear portion impart elasticity to the toner which improves the toner offset properties, while not substantially affecting the toner minimum fix temperature.

The crosslinked toner resin has a weight fraction of the microgel (gel content) in the range typically of from about 0.001 to about 50 weight percent, preferably about 0.1 to about 40 weight percent. The linear portion of the resin preferably consists essentially of low molecular weight reactive base resin which did not crosslink during the crosslinking reaction, preferably unsaturated polyester resin. The linear portion is in the range of from about 50 to about 99.999 percent by weight of said toner resin, and preferably in the range of from about 60 to about 99.9 percent by weight of said toner resin.

The minimum fix temperature of the toner of this invention is a function of the molecular weight and molecular weight distribution of the linear portion, and is not affected by the amount of microgel particles or degree of crosslinking. This is portrayed by the proximity of the viscosity curves of toner and base resin at low temperature (such as, for example, at 100° C.) in which the melt viscosity is in the range of from about 5,000 to about 250,000 poise as measured with a mechanical spectrometer at 10 radians per second. The hot offset temperature is increased with the presence of microgel particles which impart elasticity to the toner. With a higher degree of crosslinking or microgel content, the hot offset temperature increases. This is reflected in divergence of the viscosity curves at high temperature (such as, for example, at 160° C.) in which the melt viscosity is typically in the range of from about 10 to about 25,000 poise as measured a 10 radians per second depending on the amount of microgel particles in the toner.

The toner of the present invention can provide a minimum fix temperature of from about 100° C. to about 200° C., preferably about 100° C. to about 160° C., more preferably about 110° C. to about 140° C., and a wide fusing latitude to minimize or prevent offset of the toner onto the fuser roll, and maintain high toner pulverization efficiencies. The low melt toner preferably has a fusing latitude greater than 10° C., preferably from about 10° C. to about 120° C., and more preferably more than about 20° C. and even more preferably more than about 30° C. The MFT of the toner is not believed to be sensitive to the degree of crosslinking, or the gel content of the toner, while the fusing latitude increases significantly as a function of the degree of crosslinking, or gel content of the toner. Thus, it is possible to produce a series of toners with the same MFT, but with different fusing latitudes. Toners of the present invention evidenced minimized or substantially no vinyl offset, for example it has been shown by vinyl offset experiments that toner prepared from bisphenol A fumarate polyester has no vinyl offset as illustrated hereinafter, whereas toner prepared from styrene butyl methacrylate usually possesses considerable vinyl offset.

As the degree of crosslinking or microgel content increases, the low temperature melt viscosity does not change appreciably, while the high temperature melt viscosity goes up. In an exemplary embodiment, the hot offset temperature can increase approximately 30 percent. This can be achieved by crosslinking in the melt state at high temperature and high shear such as, for example, by crosslinking an unsaturated polyester using a chemical initiator in an extruder resulting in the formation of microgel alone, distributed substantially uniformly throughout the linear portion, and substantially no intermediates or sol portions which are crosslinked polymers with low crosslinking density. When crosslinked intermediate polymers are generated by conventional polymerization processes, the viscosity curves generally shift in parallel from a low to high degree of crosslinking as reflected in increased hot offset temperature, but also increased minimum fix temperature.

In a preferred embodiment, the crosslinked portion in toner of the present invention consists essentially of very high molecular weight densely crosslinked microgel particles which are not soluble in substantially any solvents such as, for example, tetrahydrofuran, toluene and the like. As discussed above, the microgel particles are highly crosslinked polymers with a very small, if any, crosslink distance. This type of crosslinked polymer may be formed by reacting chemical initiator with linear unsaturated polymer, and more preferably linear unsaturated polyester at high temperature and under high shear. The initiator molecule breaks into radicals and reacts with one or more double bond or other reactive site within the polymer chain forming a polymer radical. This polymer radical reacts with other polymer chains or polymer radicals many times, forming a highly and directly crosslinked microgel. This renders the microgel very dense and results in the microgel not swelling very well in solvent. The dense microgel also imparts elasticity to the toner and increases its hot offset temperature while not affecting its minimum fix temperature.

The gel content may be calculated by measuring the relative amounts of linear, soluble portion and the crosslinked, insoluble portion utilizing the following procedure: (1) the sample of the crosslinked toner to be analyzed, in an amount between 145 and 235 milligrams, is weighed directly into a glass centrifuge tube; (2) 45 milliliters of toluene is added and the sample is put on a shaker for at least 3 hours, preferably overnight; (3) the sample is then centrifuged at about 2,500 rpm for 30 minutes and then a 5 milliliter aliquot is carefully removed and put into a preweighed aluminum dish; (4) the toluene is allowed to air evaporate for about 2 hours, and then the sample is further dried in a convection oven at 60° C. for about 6 hours or to constant weight; and (5) the sample remaining, times nine, gives the amount of soluble portion. From this information and the concentrations of pigment and other solid additives, the gel content of the toner can be easily calculated.

The resins are generally present in the toner of the present invention in an amount of from about 40 to about 98 percent by weight, and more preferably from about 70 to about 98 percent by weight, although they may be present in greater or lesser amounts, provided that the objectives of the invention are achieved. Additional additives, for example colorant, charge enhancing additives, release agents, surfactants, emulsifiers, pigment dispersants, flow additives, and the like, can be melt blended with the resin during or after the crosslinking reaction. The resultant product can then be pulverized by known methods such as milling in a fluid energy mill to form toner particles. The toner particles preferably have an average volume particle diameter of about 5 to about 25 microns and, more preferably about 5 to about 15 microns.

Various suitable colorants can be employed in toners of the invention, including suitable colored pigments, dyes, and mixtures thereof including carbon black, such as REGAL 330® carbon black (Cabot), acetylene black, lamp black, aniline black, chrome yellow, zinc yellow, sicofast yellow, luna yellow, NOVAPERM YELLOW™, Chrome Orange, Bayplast Orange, Cadmium Red, LITHOL SCARLET™, HOSTAPERM RED™, FANAL PINK™, HOSTAPERM PINK™, LITHOL RED™, RHODAMINE LAKE B™, Brilliant Carmine, HELIOGEN BLUE™, HOSTAPERM BLUE™, NEOPAN BLUE™, PV FAST BLUE™, Cinquassi Green, HOSTAPERM GREEN™, titanium dioxide, cobalt, nickel, iron powder, SICOPUR 4068 FF™, and iron oxides, such as MAPICO BLACK® (Columbian), NP608 and NP604 (Northern Pigment), BAYFERROX 8610™ (Bayer), MO8699™ (Mobay), TMB-100™, (Magnox), mixtures thereof and the like.

The colorant, preferably carbon black, cyan, magenta and/or yellow colorant, is incorporated in an amount sufficient to impart the desired color to the toner. In general, pigment or dye is employed in an amount ranging from about 2 to about 60 percent by weight, and preferably from about 2 to about 7 percent by weight for color toner and about 5 to about 60 percent by weight for black toner.

Various known suitably effective positive or negative charge enhancing additives can be selected for incorporation into the toner compositions of the present invention, preferably in an amount of about 0.1 to about 10, more preferably about 1 to about 3 percent by weight. Examples include quaternary ammonium compounds inclusive of alkyl pyridinium halides; alkyl pyridinium compounds, reference U.S. Pat. No. 4,298,672, the disclosure of which is totally incorporated hereby by reference; organic sulfate and sulfonate compositions, U.S. Pat. No. 4,338,390, the disclosure of which is totally incorporated hereby by reference; cetyl pyridinium tetrafluoroborates; distearyl dimethyl ammonium methyl sulfate; aluminum salts such as BONTRON E84® or E88® (Hodogaya Chemical); and the like.

Also, there can be included in the toner or its surface release additives, such as waxes like low molecular weight waxes, such as with an $M_w$ of from about 1,000 to about 20,000, such as polyethylene, polypropylene and the like available from Sanyo Chemicals of Japan. Various effective amounts of wax can be selected, such as for example from about 0.1 to about 20, and preferably from about 1 to about 5 weight percent.

Additionally, other known internal and/or external additives may be added for charging, flow and lubrication of the toner in effective amounts such as, for example, from about 0.01 to about 5 weight percent, such as colloidal silica, zinc stearate, metal oxides, and the like.

The resulting toner particles optionally can be formulated into a developer composition by mixing with carrier particles. Illustrative examples of carrier particles that can be selected for mixing with the toner composition prepared in accordance with the present invention include those particles that are capable of triboelectrically obtaining a charge of opposite polarity to that of the toner particles. Accordingly, in one embodiment the carrier particles may be selected so as to be of a negative polarity in order that the toner particles, which are positively charged, will adhere to and surround the carrier particles. Illustrative examples of such carrier particles include granular zircon, granular silicon, glass, steel, nickel, iron ferrites, silicon dioxide, and the like. Additionally, there can be selected as carrier particles nickel berry carriers as disclosed in U.S. Pat. No. 3,847,604, the disclosure of which is totally incorporated herein by reference, comprised of nodular carrier beads of nickel characterized by surfaces of reoccurring recesses and protrusions thereby providing particles with a relatively large external area. Other carriers are disclosed in U.S. Pat. Nos. 4,937,166 and 4,935,326, the disclosures of which are hereby totally incorporated herein by reference.

The selected carrier particles can be used with or without a coating, the coating generally being comprised of fluoropolymers, such as polyvinylidene fluoride resins, terpolymers of styrene, methyl methacrylate, a silane, such as triethoxy silane, tetrafluorethylenes, other known coatings, and the like.

The diameter of the carrier particles is generally from about 50 microns to about 1,000 microns, preferably about 200 microns, thus allowing these particles to possess sufficient density and inertia to avoid adherence to the electrostatic images during the development process. The carrier particles can be mixed with the toner particles in various suitable combinations. However, best results are obtained when about 1 part carrier to about 10 parts to about 200 parts by weight of toner are mixed.

Toners of the invention can be used in known electrostatographic imaging methods, although the fusing energy requirements of some of those methods can be reduced in view of the advantageous fusing properties of the toner of the invention as discussed herein. Thus, for example, the toners or developers of the invention can be charged triboelectrically and applied to an oppositely charged latent image on an imaging member such as a photoreceptor or ionographic receiver. The resultant toner image can then be transferred, either directly or via an intermediate transport member, to a support such as paper or a transparency sheet. The toner image can then be fused to the support by application of heat and/or pressure, for example with a heated fuser roll at a temperature lower than 200° C., preferably lower than 160° C., more preferably lower than 140° C., and more preferably about 110° C.

The invention will further be illustrated in the following nonlimiting Examples, it being understood that these Examples are intended to be illustrative only and that the invention is not intended to be limited to the materials, conditions, process parameters and the like recited herein. Parts and percentages are by weight unless otherwise indicated.

EXAMPLE I

A xerographic toner was prepared according to the process of this invention by melt mixing 98.4 parts of a linear unsaturated propoxylated bisphenol A fumarate polyester having Mn of about 4,000, $M_w$ of about 10,300, $M_w/M_n$ of about 2.58 as measured by GPC, onset $T_g$ of about 55° C. as measured by DSC, and melt viscosity of about 29,000 poise at 100° C. and about 750 poise at 130° C. as measured at 10 radians per second, with 1.6 parts of benzoyl peroxide initiator and REGAL 330® carbon black as follows.

The unsaturated polyester resin and benzoyl peroxide initiator were blended in a rotary tumble blender at 22 revolutions per minute for 30 minutes. The resulting dry mixture was then fed into the upstream supply port located at the first barrel section of a Werner & Pfleiderer twin screw extruder, Model ZSK-30, which had a screw diameter of 30.7 millimeters and a length-to-diameter ratio of 37.2 at 10 pounds per hour using a loss-in-weight feeder. At a downstream supply port located at the 7th barrel section, a REGAL 330® carbon black was added at a rate of 0.973 pound per hour. The temperature of the 12 barrel sections and a die head of the ZSK-30 extruder was kept at a profile of 50°/70°/70°/190°/190°/190°/130°/130°/130°/130°/130°/130°/130° C. The screw rotational speed was kept at 100 revolutions per minute. The molten extrudate, upon exiting from the strand die, was cooled and solidified in a water tank and subsequently cut into pellets by a pelletizer equipped with revolving knives. The pellets were then pulverized in several steps involving the use of a mechanical impact mill and a fluid energy mill and subsequently classified to obtain toner particles with a volume average size of about 11.1 microns and a geometric standard deviation of about 1.3. Measurement of gel content showed that 34.5 percent of the base resin was crosslinked.

This toner was evaluated for fixing, blocking, and vinyl offset performance. Results showed that the minimum fix temperature was about 133° C., the hot offset temperature was about 215° C., providing a fusing latitude of about 82° C. Also, the toner had excellent blocking performance, about 52° C. as measured by DSC, and evidenced no apparent vinyl offset after a developed copy was retained in contact with a polyvinyl chloride sheet for 24 hours at an elevated temperature of 50° C.

EXAMPLE II

A xerographic toner was prepared following the procedure as described in Example I by melt mixing 98.5 parts of a linear propoxylated bisphenol A fumarate unsaturated polyester base resin with properties as described in Example I with 1.5 parts of benzoyl peroxide and adding 0.305 pound per hour of REGAL 330® carbon black downstream. After pulverizing and classification, a toner with a volume average size of about 8.9 microns and a geometric standard deviation of about 1.3 was obtained. The toner was then evaluated for fixing, blocking, and vinyl offset performance. Results showed that the minimum fix temperature was about 130° C., and the fusing latitude was about 88° C. Also, the toner had excellent blocking performance, about 52° C. as measured by DSC, and evidenced no vinyl offset after accomplishing similar measurements as described in Example I.

EXAMPLE III

A xerographic toner was prepared by melt mixing 98.5 parts of the linear unsaturated polyester of Example I with 1.5 parts of benzoyl peroxide in a batch mixer, Haake Buchler HBI System 90 Torque Rheometer. The blend was mixed at 160° C. and 100 rpm for 2 minutes during which time substantial crosslinking took place as could be detected from the torque measurement. The mixer temperature was then lowered to 120° C. and the molten mixture was allowed to cool down for several minutes. Toner additives, 6 parts of a REGAL 330® carbon black and 2 parts of a charge enhancing additive, cetyl pyridinium chloride, were then added to the mixer and blending resumed at 120° C. and 100 rpm for 15 minutes. After mixing was completed, the molten mixture was allowed to solidify. A toner was obtained following the usual pulverizing and classification steps. Fixing tests of this toner showed a minimum fix temperature of about 130° C. and a fusing latitude of about 50° C.

COMPARATIVE EXAMPLE 1

On hundred (100) parts of the linear unsaturated polyester with properties of Example I were blended with 1.63 parts of benzoyl peroxide and 6.38 parts of carbon black REGAL 330® in a rotary tumble blender at 22 revolutions per minute for 30 minutes. The resulting dry mixture was then fed into the upstream supply port of the ZSK-30 extruder. Similar feed rate, temperature profile and screw rotational speed as described in Example I were used to melt mix the three-component mixture. The molten extrudate had very low viscosity. Melt flow index measurement showed a melt index greater than 300 grams/10 minutes at 117° C. and 16.6 killigrams load. The gel content measurement accomplished as illustrated herein showed that the base resin was not crosslinked. It is believed, while not being desired to be limited by theory, that the carbon black became an inhibitor for free radical after initiation and the presence of carbon black during the benzoyl peroxide initiation had prevented the crosslinking reaction of the base resin from taking place.

COMPARATIVE EXAMPLE 2

A crosslinked resin was prepared by mixing 98.3 parts of the linear unsaturated polyester of Example I with 1.7 parts of benzoyl peroxide initiator according to the following procedure.

The unsaturated polyester resin and benzoyl peroxide initiator were blended in a rotary tumble blender at 22 revolutions per minute for 30 minutes. The resulting dry mixture was then fed into the upstream supply port located at the first barrel section of the ZSK-30 extruder at 10 pounds per hour using a loss-in-weight feeder. The temperature of the 12 barrel sections plus a die head was kept at a profile of 50°/70°/70°/100°/100°/100°/120°/140°/140°/140°/140°/140°/120° C. The screw rotational speed was kept at 100 revolutions per minute. The molten extrudate, upon exiting from the strand die, was cooled and solidified in a water tank and subsequently cut into pellets by a pelletizer equipped with revolving knives. The pellets were then pulverized in a Fitzpatrick mill to obtain particles about 0.85 millimeter in size. Measurement of gel content showed that 27.4 percent of the base resin was crosslinked. The crosslinked resin had a melt index of 19.3 grams/10 minutes at 117° C. and 16.6 killigrams load.

A toner was then prepared by melt mixing 94 parts of the partially crosslinked polyester and 6 parts of REGAL 330® carbon black according to the following procedure. The partially crosslinked polyester and carbon black were blended in a rotary tumble blender at 22 revolutions per minute for 30 minutes. The resulting dry mixture was then fed into the upstream supply port located at the first barrel section of the ZSK-30 extruder at 10 pounds per hour using a loss-in-weight feeder. The temperature of the 12 barrel sections plus a die head was kept at a profile of 50°/70°/70°/140°/140°/140°/140°/140°/140°/140°/140°/140°140° C. The screw rotational speed was kept at 140 revolutions per minute. The molten extrudate was cooled, solidified and pelletized as before. The pellets were then pulverized in several steps to obtain toner particles with a volume average size of about 11 microns and a geometric standard deviation of 1.3. Measurement of gel content showed that 14.4 percent of the resin in the toner was crosslinked. Measurement of melt flow index showed that the toner had a melt index of 29.8 grams/10 minutes at 117° C. and 16.6 killigrams load. It was speculated that the additional melt mixing step in the extruder had caused some of the gel particles to break down. This resulted in a toner with a different rheological properties.

While the invention has been described with reference to particular preferred embodiments, the invention is not limited to the specific examples given, and other embodiments and modifications can be made by those skilled in the art without departing from the spirit and scope of the invention.

What is claimed is:

1. A one step process for the preparation of toner compositions consisting essentially of adding to an extruder a thermoplastic unsaturated polyester, initiator, pigment, and optional charge enhancing additive; effecting crosslinking of the unsaturated polyester in the extruder to provide a toner comprising a pigment, optional charge additive and crosslinked resin comprising linear portions and crosslinked portions; and wherein said crosslinked portions are comprised of densely crosslinked microgel particles; and wherein the extruder barrel temperature is from about 40° C. to about 250° C.; the temperature range for mixing the resin, initiator, pigment and optional charge additive in the upstream barrel sections immediately following the extruder supply port is from about the melting temperature of the unsaturated polyester to below the crosslinking temperature; the temperature range for the crosslinking reaction in the extruder barrel zones after mixing the resin, pigment, optional additive and initiator is above the unsaturated polyester melting temperature and is within about 150° C. of the unsaturated polyester melting temperature; and the rotational speed of the extruder screw ranges from about 50 to about 500 revolutions per minute; and wherein said pigment is carbon black, which is added to the extruder subsequent to the addition of unsaturated polyester, initiator, and optional charge enhancing additive, said carbon black being added at a downstream supply port located subsequent to a sixth barrel section in said extruder.

2. A process in accordance with claim 1 wherein said microgel particles are present in an amount from about 0.001 to about 60 percent by weight of said toner resin,

3. A process in accordance with claim 1 wherein said microgel particles are present in an amount of from 0.1 to about 40 percent by weight of said toner resin.

4. A process in accordance with claim 1 wherein said microgel particles are no more than about 3.0 microns in average volume diameter and are substantially uniformly distributed in said toner.

5. A process in accordance with claim 1 wherein said microgel particles have no more than a single bridging molecule between crosslinked chains.

6. A process in accordance with claim 1 wherein said unsaturated polyester comprises linear unsaturated polyester resin.

7. A process in accordance with claim 1 wherein said degree of unsaturation is from about 5 to about 25 mole percent.

8. A process in accordance with claim 1 wherein said unsaturated polyester has a number average molecular weight ($M_n$) as measured by gel permeation chromatography in the range of from about 1,000 to about 20,000.

9. A process in accordance with claim 1 wherein said unsaturated polyester has a weight average molecular weight ($M_w$) in the range of from about 2,000 to about 40,000.

10. A process in accordance with claim 1 wherein said unsaturated polyester has a molecular weight distribution ($M_w/M_n$) of from about 1.5 to about 6.

11. A process in accordance with claim 1 wherein said unsaturated polyester has an onset glass transition temperature ($T_g$) as measured by differential scanning calorimetry in the range of from about 50° C. to about 70° C.

12. A process in accordance with claim 1 wherein said unsaturated polyester has a melt viscosity as measured with a mechanical spectrometer at 10 radians per second from about 5,000 to about 200,000 poise at 100° C., and said melt viscosity drops sharply with increasing temperature to from about 100 to about 5,000 poise as the temperature rises from 100° C. to 130° C.

13. A process in accordance with claim 1 wherein the toner has a minimum fix temperature of below 180° C.

14. A process in accordance with claim 1 wherein the toner has a minimum fix temperature of from about 100° C. to about 160° C.

15. A process in accordance with claim 1 wherein the toner has a fusing latitude of more than about 10° C.

16. A process in accordance with claim 1 wherein the toner has a fusing latitude of from about 10° to about 100° C.

17. A process in accordance with claim 1 wherein the toner has a fusing latitude of from about 30° C. to about 70° C.

18. A process in accordance with claim 1 wherein said crosslinked portions comprise large, three dimensional networks of macromolecules, which networks possess a sufficiently high molecular weight that they are insoluble, or substantially insoluble in solvents, and high molecular weight densely crosslinked gel particles, wherein said gel particles are less than about 0.1 micron in diameter and are substantially uniformly distributed in said resin, and wherein said unsaturated polyester has a number average molecular weight ranging from about 1,000 to about 20,000 and a weight average molecular weight of from about 2,000 to about 40,000, and with a molecular weight distribution of weight average molecular weight to number average molecular weight of from about 1.5 to about 6; and wherein the extruder barrel temperature is from about 100° C. to about 250° C. the temperature range for mixing the resin, initiator, pigment and optional charge additive in the upstream barrel sections immediately following the extruder supply port is from about the melting temperature of the unsaturated polyester to below the crosslinking temperature; the temperature range for the crosslinking reaction in the extruder barrel zones after mixing the resin, pigment, optional additive and initiator is above the unsaturated polyester melting temperature and is within about 150° C. of the unsaturated polyester melting temperature; and the rotational speed of the extruder screw ranges from about 100 to about 500 revolutions per minute.

19. A process in accordance with claim 18 wherein said toner resin comprises from about 0.001 to about 50 percent by weight of said crosslinked portion, said toner resin comprises from about 50 to about 99.999 percent by weight of said linear portion.

20. A process in accordance with claim 1 wherein the toner components are added to the upstream supply port of the extruder simultaneously.

21. A process in accordance with claim 1 wherein the toner components are added to the extruder sequentially at upstream and downstream supply ports.

22. A one step process for the preparation of toner compositions which comprises adding unsaturated polyester resin, initiator, pigment and charge enhancing additive to a melt mixing extruder device; melts and mixing unsaturated polyester resin with other toner components; initiating crosslinking of the molten resin; retaining the melt at high temperature for a sufficient residence time to obtain the desired degree of crosslinking; dispersing pigment; and optionally devolatilizing the melt to remove any effluent volatiles, and wherein said unsaturated polyester resin is an unsaturated polyester resin with a number average molecular weight ranging from about 1,000 to about 20,000 and a weight average molecular weight of from about 2,000 to about 40,000, and with a molecular weight distribution of weight average molecular weight to number average molecular weight of from about 1.5 to about 6; and wherein the extruder barrel temperature is from about 40° C. to about 250° C.; th temperature range for mixing the resin, initiator, pigment and optional charge additive in the upstream barrel sections immediately following the extruder supply port is from about the melting temperature of the resin to below the crosslinking temperature; the temperature range for the crosslinking reaction in the extruder barrel zones after mixing the resin, pigment, optional additive and initiator is above the resin melting temperature and is within about 150° C. of the resin melting temperature; and the rotational speed of the extruder screw ranges from about 50 to about 500 revolutions per minute.

23. A process in accordance with claim 22 wherein the melt mixing device is an extruder, and a wax is one of said toner components.

24. A process in accordance with claim 23 wherein the toner components are added to the upstream supply port of the extruder simultaneously.

25. A process in accordance with claim 23 wherein the toner components are added to the extruder sequentially at upstream and downstream supply ports.

26. A process in accordance with claim 18 wherein the toner has an onset glass transition temperature of from about 50° C. to about 70° C. and a melt viscosity, at 10 radians per second, from about 5,000 to about 250,000 poise at 100° C. and from about 10 to about 25,000 poise at 160° C.

27. A process in accordance with claim 23 wherein the toner comprises from about 4 to about 15 weight percent of carbon black pigment, from about 2 to about 8 weight percent of a wax component, from about 77 to about 94 weight percent of crosslinked resin with a linear portion, and a densely crosslinked portion.

28. A one step process for the preparation of toner compositions consisting essentially of adding to an extruder an unsaturated polyester resin, initiator, pigment, and charge enhancing additive; effecting crosslinking of the unsaturated polyester resin in the extruder to provide a toner comprising a pigment, charge additive and crosslinked resin comprising linear portions and crosslinked portions; and wherein said crosslinked portions are comprised of densely crosslinked microgel particles; and wherein the linear unsaturated polyester has a degree of unsaturation of from about 0.1 to about 30 mole percent and a number average molecular weight of from about 1,000 to about 20,000.

29. A process in accordance with claim 28 wherein the degree of unsaturation of said linear polyester is from about 5 to about 25 mole percent, and the number average molecular weight is from about 2,000 to about 5,000.

30. A process in accordance with claim 28 wherein the weight average molecular weight of said linear polyester is from about 2,000 to about 40,000, and the $M_w/M_n$ ratio is from about 1.5 to about 6.

31. A process in accordance with claim 28 wherein the glass transition temperature of the linear polyester resin is from about 50° C. to about 70° C.

32. A process in accordance with claim 1 wherein said carbon black is added at the seventh barrel section of the extruder, and said mixture of unsaturated resin and initiator are added at the first barrel section of the extruder.

* * * * *